US012519171B2

United States Patent
Rhee et al.

(10) Patent No.: US 12,519,171 B2
(45) Date of Patent: Jan. 6, 2026

(54) METHOD FOR MANUFACTURING BATTERY CELL STACK

(71) Applicant: SK On Co., Ltd., Seoul (KR)

(72) Inventors: Seo Roh Rhee, Daejeon (KR); Ji San Kim, Daejeon (KR); Chi Min Park, Daejeon (KR); Tak Kyung Yoo, Daejeon (KR)

(73) Assignee: SK On Co., Ltd., Daejeon (KR)

( * ) Notice: Subject to any disclaimer, the term of this patent is extended or adjusted under 35 U.S.C. 154(b) by 86 days.

(21) Appl. No.: 17/982,603

(22) Filed: Nov. 8, 2022

(65) Prior Publication Data

US 2023/0147796 A1     May 11, 2023

(30) Foreign Application Priority Data

Nov. 9, 2021 (KR) .......................... 10-2021-0153337

(51) Int. Cl.
*H01M 50/264* (2021.01)
*C09J 5/00* (2006.01)
(Continued)

(52) U.S. Cl.
CPC ............. *H01M 50/264* (2021.01); *C09J 5/00* (2013.01); *C09J 7/10* (2018.01); *C09J 7/383* (2018.01);
(Continued)

(58) Field of Classification Search
CPC ............. H01M 50/264; H01M 50/211; H01M 50/244; H01M 50/249; H01M 2220/20;
(Continued)

(56) References Cited

U.S. PATENT DOCUMENTS 6,037,009 A * 3/2000 Clare .................. B05C 11/1044
427/288
2020/0144573 A1* 5/2020 Park .................... H01M 10/658
(Continued)

FOREIGN PATENT DOCUMENTS

KR   10-2009-0051250 A    5/2009
KR   10-2021-0056824 A    5/2021
(Continued)

OTHER PUBLICATIONS

Korean Intellectual Property Office, Appl. 10-2021-0153337, Office Action, Oct. 27, 2025.

*Primary Examiner* — Dah-Wei D. Yuan
*Assistant Examiner* — Nga Leung V Law
(74) *Attorney, Agent, or Firm* — Jones Day (57) ABSTRACT

A method for manufacturing a battery cell stack according to exemplary embodiments of the present invention includes an application step of spraying an adhesive resin composition on one surface of a battery cell in one direction by a plurality of nozzles, wherein the nozzles are disposed in a direction different from the one direction, and at least two nozzles of the plurality of nozzles apply the adhesive resin composition in amounts different from each other. Thereby, the adhesive resin composition is applied to one surface of a non-flat battery cell, and the application amount is controlled according to portions to be applied, so that the one surface may bring into contact with another surface of another battery cell adhered thereon over an entire area in which the adhesive resin composition is applied.

18 Claims, 4 Drawing Sheets

(51) Int. Cl.
*C09J 7/10* (2018.01)
*C09J 7/38* (2018.01)
*H01M 50/211* (2021.01)

(52) U.S. Cl.
CPC ........ *H01M 50/211* (2021.01); *C09J 2203/33* (2013.01); *C09J 2301/302* (2020.08); *C09J 2301/408* (2020.08); *C09J 2301/414* (2020.08); *C09J 2421/00* (2013.01); *C09J 2423/04* (2013.01); *C09J 2425/00* (2013.01); *C09J 2431/00* (2013.01); *C09J 2467/00* (2013.01); *C09J 2475/00* (2013.01); *C09J 2477/00* (2013.01)

(58) Field of Classification Search
CPC .... H01M 50/24; C09J 5/00; C09J 7/10; C09J 7/383; C09J 2203/33; C09J 2301/302; C09J 2301/408; C09J 2301/414; C09J 2421/00; C09J 2423/04; C09J 2425/00; C09J 2431/00; C09J 2467/00; C09J 2475/00; C09J 2477/00; C09J 7/38; C09J 201/00; C09J 2301/312; Y02E 60/10; Y02P 70/50; B05D 1/02; B05C 5/02
See application file for complete search history.

(56) References Cited

U.S. PATENT DOCUMENTS

| | | | |
|---|---|---|---|
| 2021/0069829 A1* | 3/2021 | Martin | B23K 26/1464 |
| 2022/0302538 A1* | 9/2022 | Lee | H01M 50/242 |
| 2023/0135785 A1* | 5/2023 | Lim | H01M 50/103 |
| | | | 429/156 |
| 2023/0198069 A1* | 6/2023 | Kim | H01M 50/133 |
| | | | 429/163 |

FOREIGN PATENT DOCUMENTS

| | | | | |
|---|---|---|---|---|
| KR | 10-2021-0119872 A | | 10/2021 | |
| TW | 201406893 A | * | 2/2014 | ............. C09J 11/04 |

* cited by examiner

APPLICTION DIRECTION

[FIG. 4]

APPLICTION DIRECTION

METHOD FOR MANUFACTURING BATTERY CELL STACK

BACKGROUND OF THE INVENTION

1. Field of the Invention

The present invention relates to a method for manufacturing a battery cell stack.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. Examples of the secondary battery may include a nickel-cadmium battery, a nickel-metal hydride battery, a nickel-hydrogen battery, and a lithium secondary battery. Among them, since the lithium secondary batteries have a high operating voltage and excellent energy density characteristics per unit weight, they are used as a power source for portable electronic devices. Alternately, a plurality of lithium secondary batteries are connected in series, and then used in a high-output hybrid vehicle or an electric vehicle.

When used in the high-output hybrid vehicle or electric vehicle, in order to increase capacity and output of the secondary battery, a plurality of secondary batteries may be connected and used in a form of one battery module and a battery pack. In order to configure the above-described battery module or battery pack, various fastening parts or cooling equipment are required. However, these fastening parts or cooling equipment cause an increase in manufacturing costs while increasing volume and weight thereof, and also lead to a decrease in output in proportion to the increased volume and weight.

A method for manufacturing a cell stack forming a battery module by attaching a tape type adhesive to cell surfaces is also used. However, processes and equipment for inputting the tape and removing a release paper are complicated, and waste such as release paper may be generated in large quantities during manufacturing the battery module.

In addition, the tape type adhesive is formed with a uniform thickness, whereas a surface deformation occurs in the battery cell by swelling which causes the cell to expand due to repeated charging and discharging of the battery, and the flatness is changed, such that an effective adhesion area is reduced and an adhesive force of the adhesive is not properly expressed. This may further deteriorate stability and reliability of the battery module.

PRIOR ART DOCUMENT

Patent Document

Korean Patent Laid-Open Publication No. 10-2021-0056824

SUMMARY OF THE INVENTION

An object of embodiments of the present invention is to provide a method for manufacturing a battery cell stack with improved stability and reliability, by using an adhesive resin composition including a solvent-free adhesive, and applying a thickness pattern to an application method, thus to increase an effective adhesion area of the battery cell.

To achieve the above object, according to an aspect of the present invention, there is provided a method for manufacturing a battery cell stack, which includes: an application step of spraying an adhesive resin composition on one surface of a battery cell in one direction by a plurality of nozzles, wherein the nozzles are disposed in a direction different from the one direction, and at least two nozzles of the plurality of nozzles apply the adhesive resin composition in amounts different from each other.

In some embodiments, nozzles located on an outside may apply the adhesive resin composition to the one surface of the battery cell in an amount larger than that of nozzles located on an inside.

In some embodiments, at least one of the nozzles may gradually decrease the application amount of the adhesive resin composition from a portion where the application starts ("application start portion) to a predetermined portion.

In some embodiments, at least one of the nozzles may gradually increase the application amount of the adhesive resin composition from the predetermined portion to a portion where the application ends ("application end portion").

In some embodiments, at least one nozzle of the plurality of nozzles may gradually decrease the application amount of the adhesive resin composition from the application start portion to the predetermined portion, and may gradually increase the application amount of the adhesive resin composition from the predetermined portion to the application end portion.

In some embodiments, at least two nozzles of the plurality of nozzles may gradually decrease the application amount of the adhesive resin composition from the application start portion to the predetermined portion, and may gradually increase the application amount of the adhesive resin composition from the predetermined portion to the application end portion, wherein points where the decrease in the application amount of each nozzle ends or points where the increase in the application amount starts may be different from each other.

In some embodiments, the predetermined portion may correspond to a convex portion of one surface of the battery cell.

In some embodiments, in the application step, at least one of the battery cell and the nozzle may move in one direction.

In some embodiments, the adhesive resin composition may include a solvent-free adhesive.

In some embodiments, the solvent-free adhesive may include one or more selected from the group consisting of an ethylene vinyl acetate resin, polyamide resin, fatty acid polyamide resin, polyester resin, polyurethane resin, polyolefin resin, styrene resin and rubber resin.

In some embodiments, the solvent-free adhesive may be a pressure sensitive adhesive (PSA).

In some embodiments, the adhesive resin composition may include at least one of a phosphorus-based flame retardant and a nitrogen-based flame retardant.

In some embodiments, the application of the adhesive resin composition may be performed at 140 to 200° C.

In some embodiments, the resin layer may have a thickness of 0.01 mm to 0.10 mm after application.

According to the embodiments of the present invention, the adhesive resin composition is applied to one surface of a non-flat battery cell, and the application amount is controlled according to portions to be applied, so that the one surface may bring into contact with a surface of another battery cell adhered thereon in an opposition state over an entire area in which the adhesive resin composition is applied.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present invention into account and may be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

As used herein, the term "adhesive resin composition" refers to a composition including a resin component. The adhesive resin composition may be an adhesion composition or an adhesive composition.

As used herein, the term "solvent-free adhesive" refers to a thermoplastic adhesive which is made of a thermoplastic resin without using a solvent or other solvents, and is capable of being melted at a melting point or more, and then solidified by cooling. The solvent-free adhesive is a hot-melt adhesive which is applied to a material to be adhered in a liquid state at a high temperature, and exhibits an adhesive force by dissipating heat to the surface of the material to be adhered and surroundings after compression, thus to be cooled and solidified within a few seconds.

As used herein, the term "pressure sensitive adhesive (PSA)" refers to an adhesive on which an adhesive material acts when applying pressure on the adhesive so as to adhere it to an adhesive surface.

A battery cell stack according to an embodiment of the present invention may be widely used in various devices requiring electricity storage, such as an energy storage system (ESS) as well as a vehicle.

Hereinafter, specific embodiments of the present invention will be described with reference to the accompanying drawings. However, these are merely illustrative examples and the present invention is not limited thereto.

Figure 3:
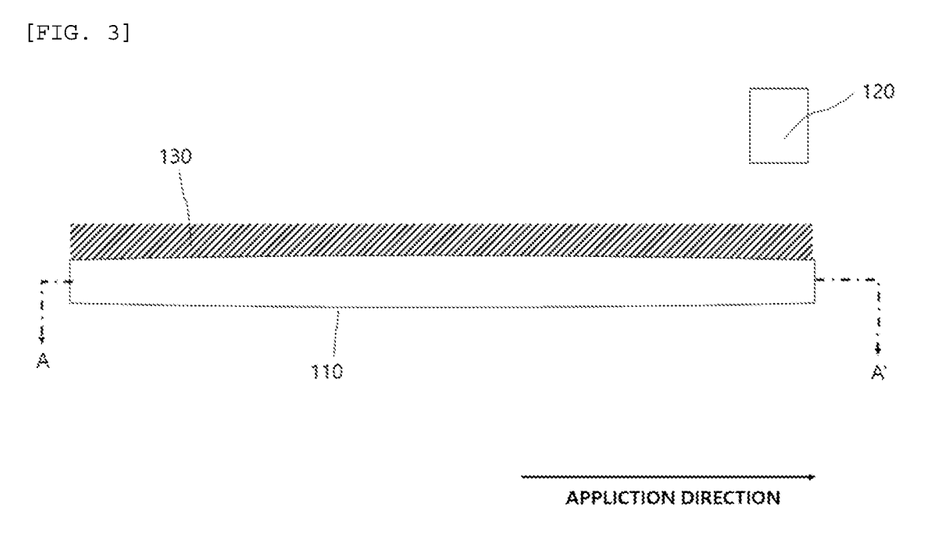
FIG. 3 is a cross-sectional view illustrating a shape taken along on line A-A' in FIG. 2.
Figure 4:
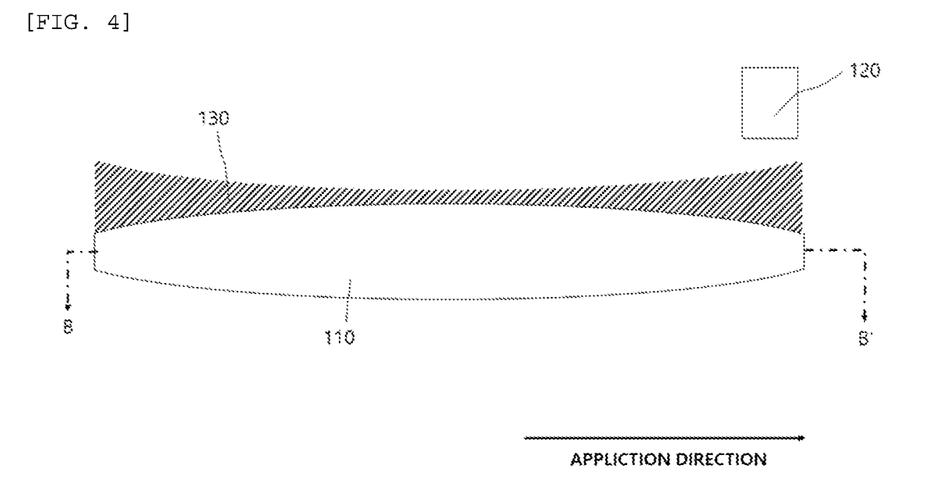
FIG. 4 is a cross-sectional view illustrating a shape taken along on line B-B' in FIG. 2.
Figure 5:
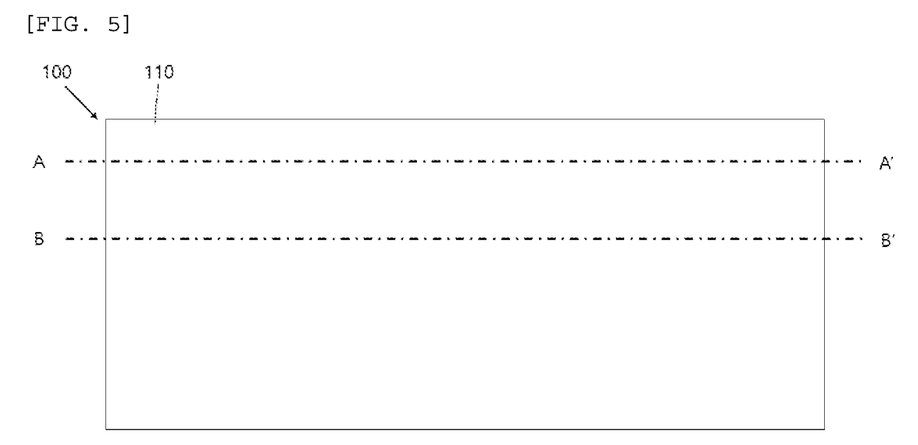
FIG. 5 is a view illustrating a battery cell stack manufactured according to an exemplary embodiment.
Figure 6:
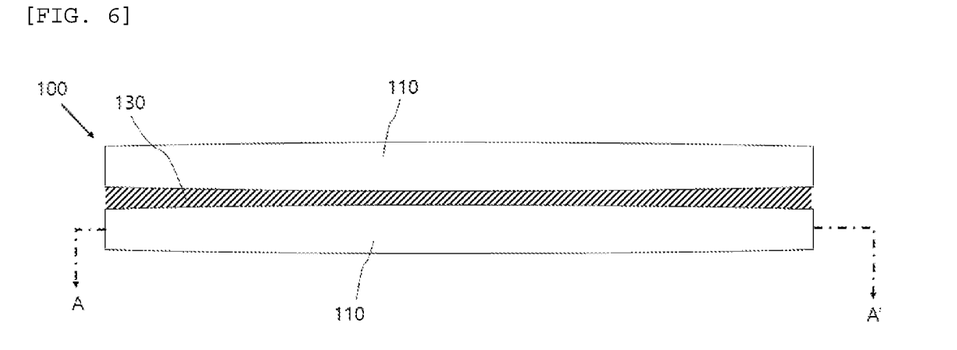
FIG. 6 is a cross-sectional view illustrating a shape taken along on line A-A' in FIG. 5.
Figure 7:
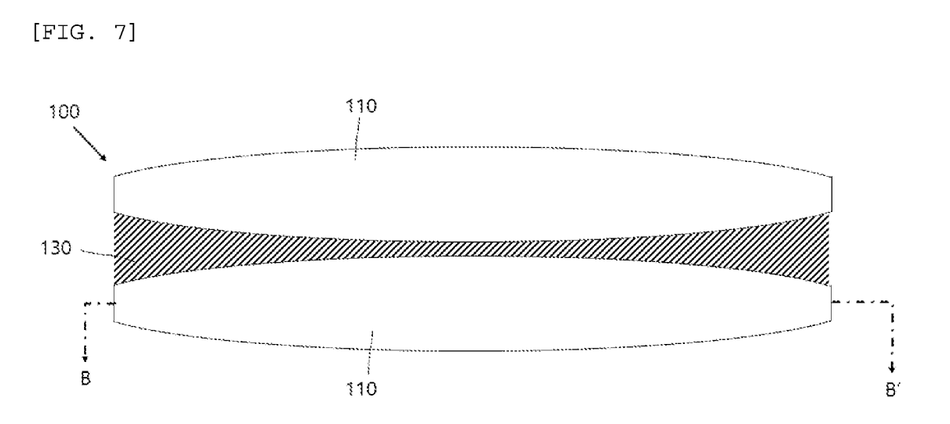
FIG. 7 is a cross-sectional view illustrating a shape taken along on line B-B' in FIG. 5.

FIGS. 1 to 4 are schematic views illustrating a method for manufacturing a battery cell stack according to exemplary embodiments, respectively, and FIGS. 5 to 7 are schematic views of a battery cell stack manufactured according to exemplary embodiments, respectively.

Referring to FIGS. 1 to 4, methods for manufacturing a battery cell stack 100 according to exemplary embodiments of the present invention include an application step of spraying an adhesive resin composition for forming a resin layer 130 to one surface of a battery cell 110 in one direction by a plurality of nozzles 120, respectively.

The battery cell 110 according to an embodiment of the present invention is a general battery cell. The battery cell 110 may be configured in a form in which an electrode assembly and an electrolyte are accommodated in a pouch. The electrode assembly includes a plurality of electrode plates and electrode tabs, and is accommodated in the pouch. Herein, the electrode plate includes a cathode plate and an anode plate, and the electrode assembly may be configured in a stacked form so that the cathode plate and the anode plate have wide surfaces facing each other with a separator interposed therebetween.

The battery cell 110 may be supplied through a supply device such as a guide roller or a conveyor belt (not shown). The nozzle 120 may apply an adhesive resin composition to one surface of the battery cell 110 to form the resin layer 130 on one surface of the battery cell 110. The nozzle 120 may receive the adhesive resin composition from a device such as a storage tank. The nozzle 120 may apply the adhesive resin composition to one surface of the battery cell 110 in a spray method while selectively controlling a spray height and a spray angle. For example, the nozzle 120 may be a spray nozzle which sprays the adhesive resin composition extruded from a melt extruder in the spray method by receiving air heated under high pressure through an air compressor.

The application may be performed in one direction, and a plurality of the nozzles 120 may be provided and disposed side by side in a direction different from the one direction in which the application is performed. The arrangement direction of the nozzles 120 is not particularly limited as long as it is a direction in which the adhesive resin composition can be applied to one surface of the battery cell 110, and for example, may be a direction orthogonal or oblique direction to the application direction, but it is not limited thereto.

As shown in FIGS. 3 and 4, at least two nozzles of the plurality of nozzles 120 may apply the adhesive resin composition to one surface of the battery cell 110 in amounts different from each other in order to increase an effective adhesion area of the battery cell 110 when manufacturing the battery cell stack 100.

As a specific embodiment, since a central portion of the battery cell 110 may be inflated more convexly than an outer portion, nozzles 120 located on an outside may apply the adhesive resin composition to one surface of the battery cell 110 in a larger amount than that of nozzles located on an inside.

As a specific embodiment, when a thickness of the battery cell 110 is increased from a portion where the application starts ("application start portion) to a predetermined portion, the nozzles 120 may apply the adhesive resin composition so as to gradually decrease the application amount thereof from the application start portion to a portion where the thickness of the battery cell 110 is increased in order to increase the effective adhesion area of the battery cell 110. In addition, when the thickness of the battery cell 110 is decreased from the predetermined portion to a portion where the application ends ("application end portion"), the nozzles 120 may apply the adhesive resin composition so as to gradually increase the application amount thereof from the predetermined portion where the thickness begins to decrease to the application end portion in order to increase the effective adhesion area of the battery cell 110.

As a specific embodiment, when the thickness of the battery cell 110 is increased and then decreased, at least one nozzle of the plurality of nozzles 120 may apply the adhesive resin composition so as to gradually decrease the application amount thereof from the application start portion to the predetermined portion, and then gradually increase the application amount of the adhesive resin composition from the predetermined portion to the application end portion.

As a specific embodiment, when the portions where the thickness of the battery cell 110 is increased and then decreased in one direction to be applied differ from each other depending on the positions of the respective nozzles 120 for applying the corresponding portions, in the respective nozzles 120, points where the decrease in the application amount of each nozzle ends or points where the increase in the application amount starts may be different from each other.

The predetermined portion may correspond to a convex portion or the thickest portion of one surface of the battery cell 110.

Figure 1:
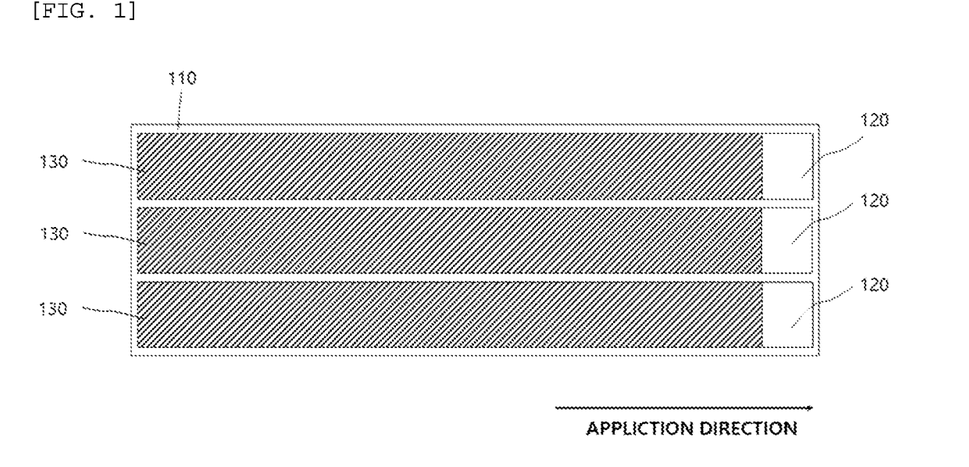
FIG. 1 is a schematic view illustrating a method for manufacturing a battery cell stack according to an exemplary embodiment.
Figure 2:
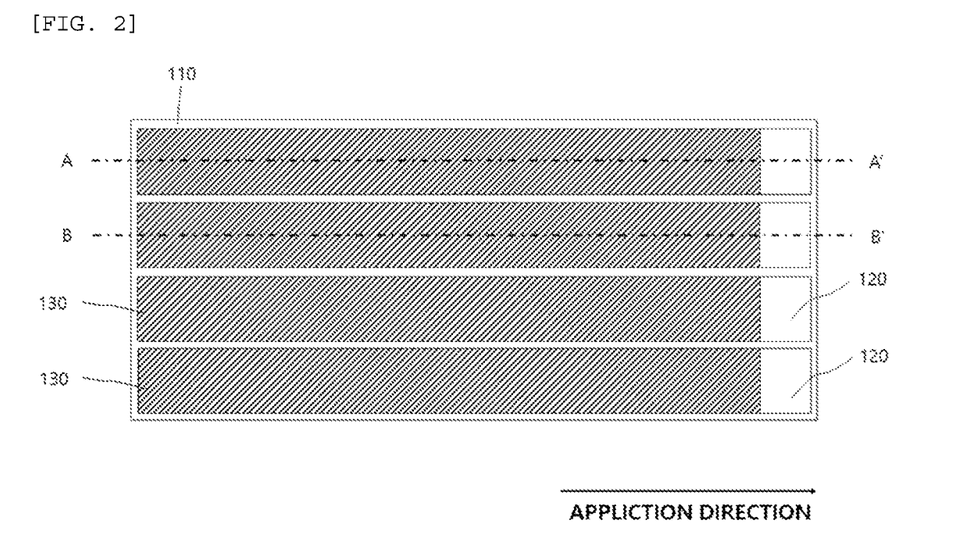
FIG. 2 is a schematic view illustrating a method for manufacturing a battery cell stack according to another exemplary embodiment.

As a specific embodiment, the application may be performed in a state in which the nozzles 120 are fixed while the battery cell 110 moves in one direction. On the other hand, the application may also be performed in a state in which the battery cell 110 is fixed while the nozzles 120 move in one direction. In addition, the application may also be performed while the nozzles 120 move at speeds different from each other.

In some embodiments, a composition of the resin layer 130 ("resin layer 130 composition") applied to one surface of the battery cell 110 through the nozzles 120 may include a solvent-free adhesive material, preferably a pressure sensitive adhesive (PSA) material, and more preferably a solvent-free or hot-melt coatable pressure sensitive adhesive.

In some embodiments, an applicator including the nozzle 120 may include a controller which executes a pre-stored processing program to control operations of the nozzles 120. Therefore, as described above, it is possible to apply the resin layer 130 composition on one surface of the battery cell 110 by determining the application amount depending on the portion of the battery cell 110.

In some embodiments, the applicator including the nozzle 120 may include a sensor capable of detecting a surface height of the battery cell 110 to determine the application amount of the resin layer 130 composition sprayed from the nozzles 120 and apply the composition depending on the detected surface height.

In some embodiments, the solvent-free adhesive may include one or more selected from the group consisting of an ethylene vinyl acetate resin, polyamide resin, fatty acid polyamide resin, polyester resin, polyurethane resin, polyolefin resin, styrene resin and rubber resin.

In some embodiments, the resin layer 130 may include a flame retardant. Since the resin layer 130 including a solvent-free adhesive may be applied in a spray method, in order to simultaneously exhibit effective flame retardancy while exhibiting appropriate physical properties, the flame retardant preferably includes one or more of a phosphorus-based flame retardant and a nitrogen-based flame retardant.

In some exemplary embodiments, the phosphorus-based flame retardant may include a phosphate compound, a phosphonate compound, a phosphinate compound, a phosphine oxide compound, a phosphazene compound, or metal salts thereof and the like. These compounds may be used alone or in combination of two or more thereof.

As a specific example, the phosphorus-based flame retardant may include diphenyl phosphate, diaryl phosphate, triphenyl phosphate, tricresyl phosphate, trizyrenyl phosphate, tri(2,6-dimethylphenyl)phosphate, tri(2,4,6-trimethylphenyl)phosphate, tri(2,4-di-tert-butylphenyl)phosphate, tri(2,6-dimethylphenyl)phosphate, bisphenol-A bis(diphenylphosphate), resorcinol bis(diphenylphosphate), resorcinol bis[bis(2,6-dimethylphenyl)phosphate], resorcinol bis[bis(2,4-di-tert-butylphenyl)phosphate], hydroquinone bis[bis(2,6-dimethylphenyl)phosphate], hydroquinone bis[bis(2,4-di-tert-butylphenyl)phosphate], an oligomeric phosphoric acid ester compound, and the like, but it is not limited thereto. These compounds may be applied alone or in a form of a mixture of two or more thereof.

As a specific example, the nitrogen-based flame retardant may include melamine and melamine derivatives. These may be used alone or in combination of two or more thereof.

As a specific example, the nitrogen-based flame retardant may include melamine, melamine phosphate, melamine cyanurate, etc., but it is not limited thereto. These may be applied alone or in a form of a mixture of two or more thereof.

In some embodiments, the flame retardant may be included in a ratio of 10 to 50 parts by weight ("wt. parts") based on 100 wt. parts of the resin layer.

The contents of the above-described phosphorus-based flame retardant and the nitrogen-based flame retardant are preferably added and used alone or in the same proportion as each other in a sum of both retardants. If the proportion of the flame retardant is less than 10 wt. parts, the flame retardancy is insufficient, whereas if it exceeds 50 wt. parts, physical properties such as an adhesive force or workability when applying the resin layer may be deteriorated.

In some embodiments, the resin layer 120 may have a softening point of about 60 to 140° C., and preferably about 80 to 105° C. In the above softening point range, when a defect occurs during manufacturing the battery cell stack 100, a rework is easily performed and a damage to the cell may be minimized, as well as the resin layer 120 may be easily removed when recycling the battery cell stack 100. Whereas, if the softening point is less than 60° C., the viscosity of the resin layer 130 composition is increased, such that nozzle clogging of an applicator or scattering of the resin layer 130 composition may occur when applying the resin layer, and re-liquefaction may occur in the resin layer 130 due to heat generated from the battery cell 110, and thereby causing the impact resistance of the battery cell stack 100 to be deteriorated. If the softening point exceeds 140° C., a damage due to heat may occur in the battery cell 110 when the resin layer 130 is re-liquefied.

The resin layer 120 may be formed in a form of a relatively thin layer compared to the battery cell 110. In this case, the resin layer 120 may have a thickness within a range of 0.01 to 0.10 mm, or 0.02 to 0.08 mm, or about 0.03 to 0.05 mm, for example. If the resin layer 120 is less than 0.01 mm, a fixing force between the battery cells 110 is weakened to cause a reduction in the stability of the battery cell stack 100, whereas if it exceeds 0.10 mm, insulation properties may be deteriorated. The thickness may be a thickness of the thinnest portion, a thickness of the thickest portion, or an average thickness of the resin layer 120.

Referring to FIGS. 5 to 7, the battery cell stack 100 manufactured according to exemplary embodiments of the present invention is configured by stacking a plurality of battery cells 110. The battery cells 110 may be vertically erected and stacked in a left-and-right direction (i.e., in a horizontal direction), but may be horizontally laid down and stacked in an up-and-down direction (i.e., in a vertical direction) as necessary.

The battery cell 110 may be fixed by the resin layer 130. For example, the resin layer 130 may be formed on the outer surface of the battery cell 110 to be mutually fixed to the battery cell 110 adjacent thereto.

Meanwhile, in some embodiments, after the application step, an additional battery cell 120 may be stacked again on the applied resin layer 130 composition to manufacture the battery cell stack 100. The stacking of the battery cells 120 may be performed continuously after application of the resin layer 130 composition. In addition, the process of re-applying the resin layer 130 composition on the stacked battery cell 120 and stacking the additional battery cell 120 again may be repeatedly performed.

DESCRIPTION OF REFERENCE NUMERALS

100: Battery cell stack
110: Battery cell
120: Nozzle
130: Resin layer

What is claimed is:

1. A method for manufacturing a battery cell stack, the method comprising:
spraying an adhesive resin composition on one surface of a battery cell in one direction by a plurality of nozzles to form a resin layer; and
stacking another battery cell on the battery cell with the resin layer interposed therebetween,
wherein, at the time of spraying, a thickness of the battery cells is increased or decreased along the one direction,
wherein the plurality of nozzles are disposed in a direction different from the one direction, and at least two nozzles of the plurality of nozzles apply the adhesive resin composition in amounts different from each other, and
wherein nozzles located on an outside of the plurality of nozzles apply the adhesive resin composition to the one surface of the battery cell in an amount larger than that of nozzles located on an inside of the plurality of nozzles, and at least one nozzle of the plurality of nozzles decreases the amount of adhesive resin composition where the thickness of the battery cell increases, and at least one nozzle of the plurality of nozzles increases the amount of adhesive resin composition where the thickness of the battery cell decreases, so that the one surface of the battery cell comes into contact with a surface of another battery cell via the adhesive resin composition.

2. The method according to claim 1, wherein at least one of the nozzles gradually decreases the application amount of the adhesive resin composition from an application start portion where the application starts to a predetermined portion.

3. The method according to claim 1, wherein at least one of the nozzles gradually increases the application amount of the adhesive resin composition from a predetermined portion to an application end portion where the application ends.

4. The method according to claim 1, wherein at least one of the plurality of nozzles gradually decreases the application amount of the adhesive resin composition from an application start portion to a predetermined portion, and gradually increases the application amount of the adhesive resin composition from the predetermined portion to an application end portion.

5. The method according to claim 1, wherein at least two nozzles of the plurality of nozzles gradually decrease the application amount of the adhesive resin composition from an application start portion to a predetermined portion, and gradually increase the application amount of the adhesive resin composition from the predetermined portion to an application end portion, wherein points where the decrease in the application amount of each nozzle ends or points where the increase in the application amount starts are different from each other.

6. The method according to claim 2, wherein the predetermined portion corresponds to a convex portion of one surface of the battery cell.

7. The method according to claim 1, wherein in at least one of the battery cell and the nozzle moves in one direction.

8. The method according to claim 1, wherein the adhesive resin composition includes a solvent-free adhesive.

9. The method according to claim 8, wherein the solvent-free adhesive includes one or more selected from the group consisting of an ethylene vinyl acetate resin, polyamide resin, fatty acid polyamide resin, polyester resin, polyurethane resin, polyolefin resin, styrene resin and rubber resin.

10. The method according to claim 8, wherein the solvent-free adhesive is a pressure sensitive adhesive (PSA).

11. The method according to claim 1, wherein the adhesive resin composition includes at least one of a phosphorus-based flame retardant and a nitrogen-based flame retardant.

12. The method according to claim 1, wherein the application of the adhesive resin composition is performed at 140° C. to 200° C.

13. The method according to claim 1, wherein the resin layer has a thickness of 0.01 mm to 0.10 mm after application.

14. A method for manufacturing a battery cell stack, comprising:
spraying an adhesive resin composition on one surface of a battery cell in one direction by a plurality of nozzles to form a resin layer; and
stacking another battery cell on the battery cell with the resin layer interposed therebetween,
wherein, at the time of spraying, a thickness of the battery cells is increased or decreased along the one direction,
wherein the plurality of nozzles are disposed in a direction different from the one direction, and at least two nozzles of the plurality of nozzles apply the adhesive resin composition in amounts different from each other,
wherein at least one of the plurality of nozzles gradually decreases an application amount of the adhesive resin composition from an end portion of the battery cell and increases the application amount of the adhesive resin composition from an intermediate portion to the other end portion of the battery cell, and
wherein at least one nozzle of the plurality of nozzles decreases the amount of adhesive resin composition where the thickness of the battery cell increases, and at least one nozzle of the plurality of nozzles increases the amount of adhesive resin composition where the thickness of the battery cell decreases, so that the one surface of the battery cell comes into contact with a surface of another battery cell via the adhesive resin composition.

15. The method of claim 14, wherein the battery cell has a convex portion, and the convex portion includes the intermediate portion.

16. The method of claim 14, wherein the plurality of nozzles comprises a nozzle located on an outside of the plurality of nozzles and a nozzle located on an inside of the plurality of nozzles,
   wherein an application amount of the adhesive resin composition from the nozzle located on the outside is larger than that from the nozzle located on the inside.

17. The method according to claim 1, further comprising determining an application amount of the adhesive resin composition using a sensor capable of detecting a surface height of the battery cell.

18. The method according to claim 14, further comprising determining the application amount of the adhesive resin composition using a sensor capable of detecting a surface height of the battery cell.

\* \* \* \* \*